(12) United States Patent
Valera (10) Patent No.: US 10,768,348 B2
(45) Date of Patent: Sep. 8, 2020

(54) OPTICAL DISPLAY DEVICE (71) Applicant: Wave Optics Ltd, Oxfordshire (GB)

(72) Inventor: Salim Valera, Oxfordshire (GB)

(73) Assignee: Wave Optics Ltd, Oxfordshire (GB)

( * ) Notice: Subject to any disclaimer, the term of this patent is extended or adjusted under 35 U.S.C. 154(b) by 199 days.

(21) Appl. No.: 15/579,347

(22) PCT Filed: Jun. 1, 2016

(86) PCT No.: PCT/GB2016/051598
§ 371 (c)(1),
(2) Date: Dec. 4, 2017

(87) PCT Pub. No.: WO2016/198832
PCT Pub. Date: Dec. 15, 2016

(65) Prior Publication Data
US 2018/0217305 A1 Aug. 2, 2018

Related U.S. Application Data (60) Provisional application No. 61/173,422, filed on Jun. 10, 2015.

(30) Foreign Application Priority Data

May 3, 2016 (GB) .................................. 1607701.8

(51) Int. Cl.
*G02B 5/18* (2006.01)
*G02B 27/01* (2006.01)
(Continued)

(52) U.S. Cl.
CPC ............. *G02B 5/1814* (2013.01); *G02B 6/00* (2013.01); *G02B 6/34* (2013.01); *G02B 27/0101* (2013.01);
(Continued)

(58) Field of Classification Search
CPC .. G02B 6/0016; G02B 5/1814; G02B 5/1866; G02B 5/1809; G02B 5/1828;
(Continued)

(56) References Cited

U.S. PATENT DOCUMENTS 5,712,694 A   1/1998  Taira et al.
2002/0044359 A1* 4/2002 Shimmo ............ G02B 5/1861
                                                         359/572

(Continued)

FOREIGN PATENT DOCUMENTS

EP    0704655 A1   4/1996
EP    2065751 A2   6/2009
(Continued)

OTHER PUBLICATIONS

International Preliminary Report on Patentability dated Dec. 12, 2017 for PCT/GB2016/051598.
(Continued)

*Primary Examiner* — William R Alexander
*Assistant Examiner* — Ephrem Z Mebrahtu
(74) *Attorney, Agent, or Firm* — Stoel Rives LLP (57) ABSTRACT

An optical display device (600, 700) is disclosed. A diffractive optical element (618, 718) is mounted on a substrate (611, 711). The diffractive optical element comprises a blazed grating (619, 719) and a remnant layer (617, 717) which is formed of the same polymer-based material as the blazed grating. The remnant layer (617, 717) is positioned adjacent the substrate (611, 711) and a refractive index mismatch is provided between the two. The depth of the remnant layer is selected so that light diffracted by the grating and light reflected by the interface re-combine and interfere constructively for selected angles of incidence in order to undergo thin-film interference.

13 Claims, 8 Drawing Sheets

(51) Int. Cl.
  *G02B 27/10* (2006.01)
  *G02B 6/34* (2006.01)
  *G02B 6/00* (2006.01)
(52) U.S. Cl.
  CPC ..... *G02B 27/0172* (2013.01); *G02B 27/1086* (2013.01); *G02B 2027/0118* (2013.01); *G02B 2027/0123* (2013.01)
(58) Field of Classification Search
  CPC .. G02B 5/1833; G02B 5/1838; G02B 5/1847; G02B 5/1871; G02B 27/017; G02B 27/0172
  See application file for complete search history.

(56) References Cited

U.S. PATENT DOCUMENTS

| | | | |
|---|---|---|---|
| 2008/0231956 A1* | 9/2008 | Yasui | G02B 1/04 359/576 |
| 2009/0052040 A1* | 2/2009 | Suzuki | G02B 5/1842 359/576 |
| 2009/0079909 A1 | 3/2009 | Ouderkirk et al. | |
| 2010/0067257 A1 | 3/2010 | Meis et al. | |
| 2011/0248904 A1* | 10/2011 | Miyawaki | G02B 27/017 345/7 |
| 2012/0044572 A1 | 2/2012 | Simmonds et al. | |
| 2012/0212689 A1 | 8/2012 | Chang et al. | |
| 2014/0270638 A1* | 9/2014 | Magnusson | G02B 5/1809 385/29 |

FOREIGN PATENT DOCUMENTS

| | | |
|---|---|---|
| EP | 2381290 A1 | 10/2011 |
| WO | 2007071794 A2 | 6/2007 |
| WO | 2016198832 | 12/2016 |

OTHER PUBLICATIONS

International Search Report and Written Opinion dated Sep. 22, 2016 for PCT/GB2016/051598.

* cited by examiner

OPTICAL DISPLAY DEVICE

CROSS-REFERENCE TO RELATED APPLICATIONS

This application is a national stage application under 35 U.S.C. § 371 of International Application No. PCT/GB2016/051598, titled OPTICAL DISPLAY DEVICE, filed Jun. 1, 2016, which claims priority to Great Britain Application No. 1607701.8, filed May 3, 2016 and U.S. provisional application No. 62/173,422, filed Jun. 10, 2015, all of which are hereby incorporated by reference in their entireties.

The invention relates to an augmented reality optical display device which can be used in applications such as head-up displays, augmented reality glasses or helmet-mounted displays. In particular the invention relates to a device that can improve the uniformity of illumination of a display over a broad field of view.

An augmented reality display allows a user to view their surroundings as well as projected images. In military or transportation applications the projected images can be overlaid on the real world perceived by the user. Other applications for these displays include video games and wearable devices, such as glasses.

In a normal set-up a transparent display screen is provided in front of a user so that they can continue to see the physical world. The display screen is typically a glass waveguide, and a projector is provided to one side. Light from the projector is coupled into the waveguide by an input diffraction grating. The projected light is totally internally reflected within the waveguide. The light is then coupled out of the waveguide by an output diffraction grating so that it can be viewed by a user. The projector can provide information and/or images that augment a user's view of the physical world.

Figure 1:
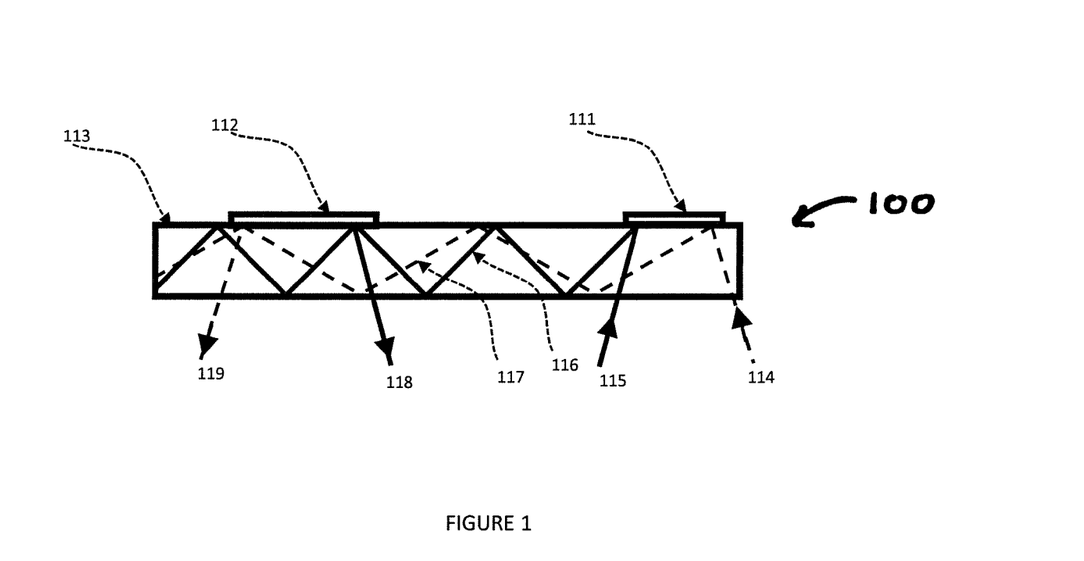
FIG. 1 is a cross-sectional view of a conventional optical display device.

A cross-sectional view of an optical display device 100 in a conventional arrangement is shown in FIG. 1. In this arrangement a transparent substrate or waveguide 113 supports an input diffractive optical element 111 and an output diffractive optical element 112, both of which are in intimate contact with a surface of the substrate 113. Light is received at the input diffractive optical element 111 from a range of angles, as illustrated by input beams 114, 115. The input beams are diffracted by the input diffractive optical element 111, operating in reflection, and they are totally internally reflected within the substrate 113 as trapped beams 116, 117. The trapped beams 116, 117 continue to travel through the substrate or waveguide 113 until they reach the output diffractive optical element 112. The output diffractive optical element 112 also operates in reflection and it diffracts the trapped beams 116, 117, coupling them out of the substrate 113 as exit beams 118, 119. These exit beams can then be viewed by a user's eye. The substrate 113 is transparent, meaning that the user can also view images from the real world that are transmitted through the substrate 113.

The input diffractive optical element 111 operates with a high efficiency to maximise the amount of light that is coupled into the substrate 113. On the other hand, the output diffractive optical element 112 operates with a relatively low efficiency. This allows expansion of the beam along the length of the substrate 113. The trapped beams 116, 117 typically interact with the output diffractive optical element 112 at a number of positions along the length of the substrate 113. At each interaction with the output diffractive optical element 112, the trapped rays 116, 117 are coupled out of the substrate 113 or are further reflected within the substrate 113 for interaction with the output diffractive optical element 112 at another position.

Figure 2:
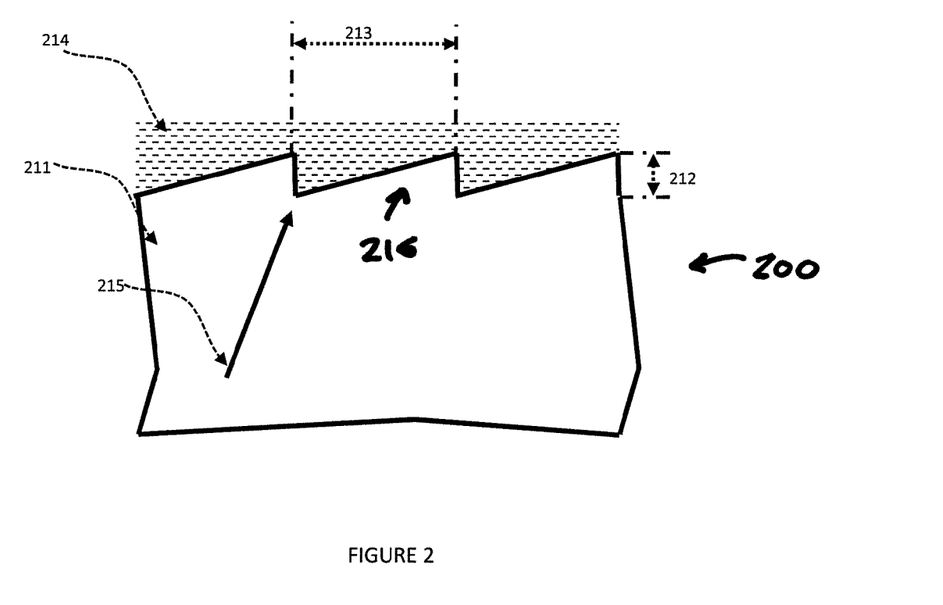
FIG. 2 is a cross-sectional view of a conventional input diffractive optical element.

FIG. 2 is a cross-sectional view of a conventional input diffractive optical element 200. In this arrangement a blazed grating 216 is provided on a surface of a substrate 211. The grating 216 has a sawtooth profile with a period 213 of 520 nm and a feature height 212 of 220 nm. The substrate 211 has a refractive index of 1.5 and the refractive index of the blazed grating 216 is closely matched to that of the substrate. An overcoat of silver 214 is applied to the surface of the blazed grating 216, and light rays 215 are made incident on the grating 216 from the substrate 211 side. Typically a remnant layer (not shown) is provided between the blazed grating 216 and the substrate 211. The remnant layer (not shown) is formed of the same material as the blazed grating 216 and therefore its refractive index is also closely matched to the substrate 211.

Figure 3:
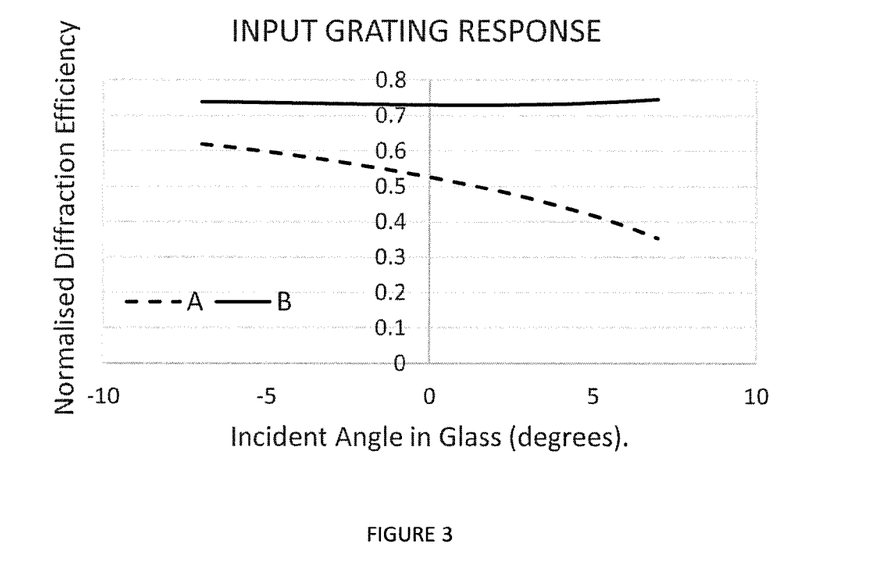
FIG. 3 is a graph showing the diffraction efficiency of an input diffractive optical element against angle of incidence.

FIG. 3 is a graph showing the diffraction efficiency of an input diffractive optical element against angle of incidence. The response of the input diffractive optical element 200 of FIG. 2 is shown by trace "A" for rays with a wavelength of 630 nm and an angle of incidence of ±7° in the substrate 211. Trace "A" shows uneven diffraction efficiency across the field of view. This is undesirable for a viewer as it is likely to produce an image with a brightness differential across the field of view.

Figure 4:
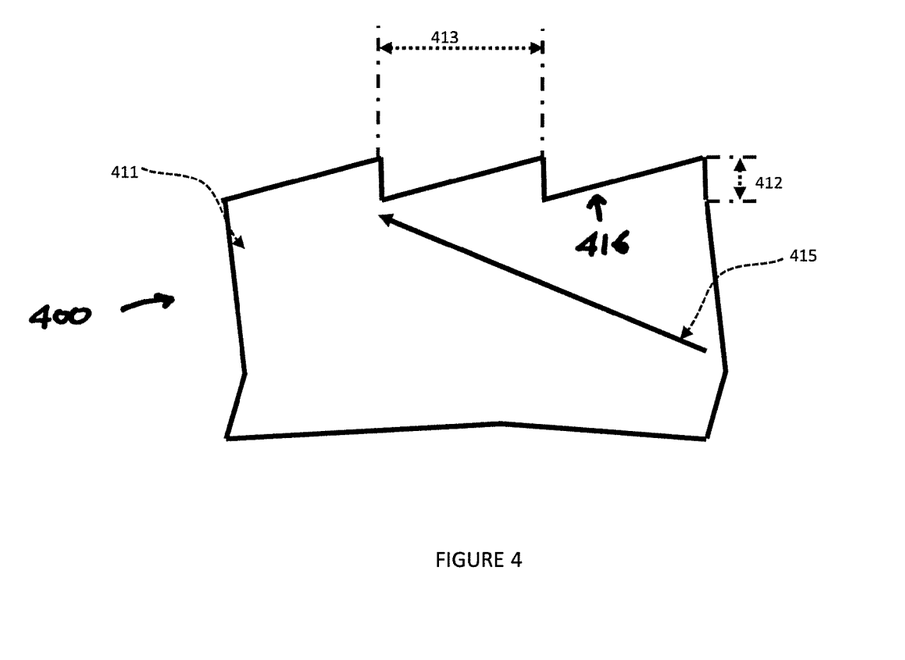
FIG. 4 is a cross-sectional view of a conventional output diffractive optical element.

FIG. 4 is a cross-sectional view of a conventional output diffractive optical element 400. In this arrangement a blazed grating 416 is provided on a surface of a substrate 411. The grating has a period 413 of 520 nm and feature height 412 of 100 nm. The substrate 411 has a refractive index of 1.5 and the refractive index of the blazed grating 416 is closely matched to that of the substrate. Unlike the input diffractive optical element 200, there is no reflective overcoat because there is no requirement to increase diffractive efficiency of the output diffractive optical element 400. In contrast, it is desirable for the output grating to have a low diffractive efficiency to enable beam expansion. Typically a remnant layer (not shown) is provided between the blazed grating 416 and the substrate 411. The remnant layer (not shown) is formed of the same material as the blazed grating 416 and therefore its refractive index is also closely matched to the substrate 411.

Figure 5:
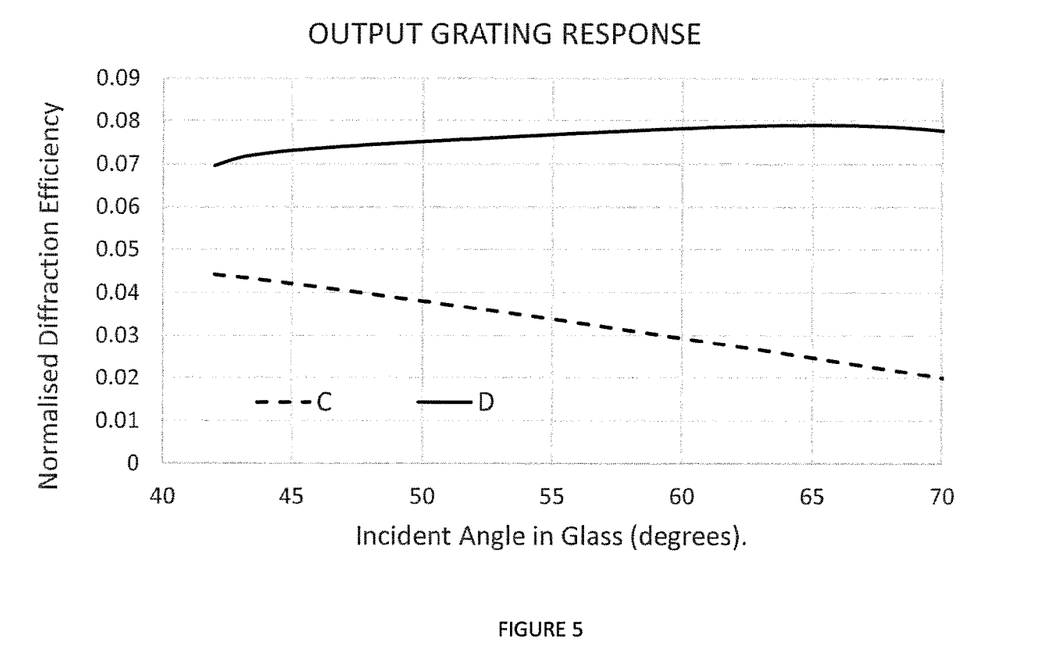
FIG. 5 is a graph showing the diffraction efficiency of an output diffractive optical element against angle of incidence.

FIG. 5 is a graph showing the diffraction efficiency of an output diffractive optical element against angle of incidence. The response of the output diffractive optical element 400 of FIG. 4 is shown by trace "C" for rays with a wavelength of 630 nm and an angle of incidence of 42° to 70° in the substrate 411. Trace "C" shows uneven diffraction efficiency across the field of view. This is undesirable for a viewer; it is likely to produce an image with brightness differences across the field of view. The effect is especially pronounced when the output diffractive optical element 400 is used in combination with the input diffractive optical element 200 shown in FIG. 2, since it also exhibits uneven diffraction efficiency across the field of view.

U.S. 2012/0044572 discusses the issue of uneven diffraction efficiency for different angles of incidence across a field of view for surface relief gratings in the context of augmented reality displays or projection displays. The document describes an optical waveguide in which a dielectric material is provided on a surface relief grating and is made to conform to the profile of the grating. It is stated that this improves the flatness of the diffraction efficiency across a field of view. One possible disadvantage of this technique is the additional production cost associated with the layer of dielectric. In addition, the slanted surfaces of the gratings may make it difficult to apply a uniform coating layer across the whole of the blaze length.

An object of the invention is to address one or more of these problems and to provide another technique for improving the flatness of the diffraction efficiency from a surface relief grating across a field of view.

According to an aspect of the present invention there is provided an optical display device comprising: a substrate; a diffractive optical element comprising a surface relief grating and a remnant layer, wherein the remnant layer is provided between the surface relief grating and the substrate; wherein a partially reflective interface is provided between the substrate and the remnant layer, and wherein the thickness of the remnant layer is controlled to enable thin-film interference for light having a predetermined wavelength that is received at the partially reflective interface from the substrate at a predetermined angle of incidence.

In this way phase matching can be achieved for light that is received at the diffractive optical element from the substrate. With the diffractive optical element operating in reflection, it is believed that light received at the partially reflective interface can be reflected or else transmitted into the remnant layer for diffraction by the surface relief grating. The reflected and transmitted/diffracted light can then re-combine with constructive interference. This can permit improved diffraction efficiency for a range of angles around the predetermined angle and for a range of wavelengths around the predetermined wavelength. Advantageously this can improve the flatness of illumination over a broad field of view, and this can improve the viewing experience for a user of the display. This can be achieved without applying any dielectric coating which can reduce the overall cost of manufacture. The resulting diffractive optical element can be used in transmission and/or reflection.

The remnant layer is typically created along with the surface relief grating, and is formed of the same material. Previously, the remnant layer has been viewed as a by-product. In prior art designs the remnant layer thickness was not taken into account in diffraction simulations. The remnant layer may have been assumed to be infinitely thick, or else thicker than the coherence length of most light sources. Thus, it may have been assumed that the remnant layer would not have any significant effect on the diffracted light. The present invention involves active control of the thickness of the remnant layer to enable thin-film interference for light having a predetermined wavelength that is received at the remnant layer from the substrate at a predetermined angle of incidence.

Preferably the partially reflective interface is provided between the substrate and the diffractive optical element which have respective refractive indices that are mismatched. This may be a convenient arrangement for facilitating reflection of light received at the substrate/diffractive optical element interface. Thin-film interference is advantageously achieved by providing a remnant layer with a thickness that is preferably less than the wavelength of the light.

It has been found that the control of at least two variables may be important in facilitating thin-film interference: a difference in refractive index between the substrate and the diffractive optical element and the thickness of the remnant layer. It has been found that the provision of a relatively high refractive index difference may necessitate a relatively thin remnant layer; this arrangement may also provide a wider angular and chromatic bandwidth.

Conversely, it has been found that the provision of a relatively small refractive index difference may necessitate a relatively thick remnant layer in order to achieve the desired thin-film interference.

It is conceivable that a reflective layer could be present between the substrate and the diffractive optical element to facilitate reflection at the interface. In such an arrangement it is possible that the substrate could have the same refractive index as the diffractive optical element. However, this arrangement is not presently preferred because it would increase the number of manufacturing steps.

Preferably the refractive index of the substrate is less than the refractive index of the diffractive optical element. It has been found through experiment that this provides the best results. However, it may be possible to enable effective thin-film interference in the alternative arrangement where the refractive index of the substrate is greater than the refractive index of the diffractive optical element.

Preferably the remnant layer has a thickness of between 80 nm and 500 nm. The remnant layer may have an absolute thickness of less than 500 nm. From a practical perspective it may be difficult to manufacture a remnant layer with a thickness that is significantly less than 100 nm.

The thickness of the remnant layer may be controlled to enable thin-film interference for light in a range of wavelengths from a first wavelength to a second wavelength, and the optical thickness of the remnant layer may be approximately half of the average of the first and second wavelengths. The optical thickness of the remnant layer is preferably the absolute thickness of the layer multiplied by its refractive index. Thus, if the diffractive optical element is designed to achieve a flat diffraction efficiency response over a range of wavelengths from 530 nm to 630 nm then the optical thickness of the remnant layer may be calculated as 290 nm (which is half of 580 nm—the average of the first and second wavelengths).

The diffractive optical element may be an input diffractive optical element, configured to couple light into the substrate for total internal reflection. In this arrangement light may be received at the substrate from a light source around a range of angles centred on the substrate's normal vector. The thickness of the remnant layer may be controlled to enable thin-film interference for light at a predetermined wavelength that is received at the remnant layer from the substrate along an angle of incidence that is coincident with the normal of the remnant layer. A substantially flat diffraction efficiency may be achieved for angles of incidence in the range of ±10° around the normal vector, or within a field of view of around 20°.

A reflective coating may be provided to the diffractive optical element to improve the efficiency with which light is coupled into the substrate. The reflective coating may be made of metal such as gold, silver or aluminium.

The optical display device may further comprise an output diffractive optical element comprising an output surface relief grating and an output remnant layer. The output remnant layer may be provided between the output surface relief grating and the substrate, and an output partially reflective interface may be provided between the substrate and the output remnant layer. Preferably the thickness of the output remnant layer is controlled to enable thin-film interference for light having a predetermined wavelength that is received at the output partially reflective interface from the substrate at a predetermined angle of incidence.

In this way, the optical display device can comprise an input and an output diffractive optical element, both of which are arranged on the substrate. The input diffractive optical element can couple light into the substrate and the output diffractive optical element can couple light out of the substrate for viewing by a user. Both of the diffractive optical elements can enable a flat diffraction efficiency response for respective angles of incidence to allow even illumination over a field of view.

In another arrangement the diffractive optical element may be an output diffractive optical element, configured to couple light out of the substrate for viewing by a user. In this arrangement the diffractive optical element may receive light that has been totally internally reflected within the substrate. Thus, thin-film interference may be enabled for angles of incidence that are consistent with total internal reflection.

The surface relief grating may be a blazed or sawtooth grating or may comprise etched grooves. It has been found that the effects of the invention can be achieved through the use of any design of surface relief grating.

According to another aspect of the invention there is provided a method of manufacture for an optical display device, the method comprising the steps of: providing a substrate; providing a diffractive optical element comprising a surface relief grating and a remnant layer, wherein the remnant layer is provided between the surface relief grating and the substrate; providing a partially reflective interface between the substrate and the remnant layer; and controlling the thickness of the remnant layer to enable thin-film interference for light having a predetermined wavelength that is received at the partially reflective interface from the substrate at a predetermined angle of incidence.

A mould may be provided to position the diffractive optical element on the substrate. The mould may comprise a first portion for creating the surface relief grating and a second portion for creating the remnant layer. The mould may comprise at least one spacer for positioning the surface relief grating relative to the substrate and for controlling the depth of the remnant layer. The method step of providing a partially reflective interface may comprise providing the substrate and the diffractive optical element with respective refractive indices that are mismatched.

Method features may be provided as apparatus features and vice-versa.

Features of the present invention will now be described, by way of example, with reference to the following drawings.

Figure 6:
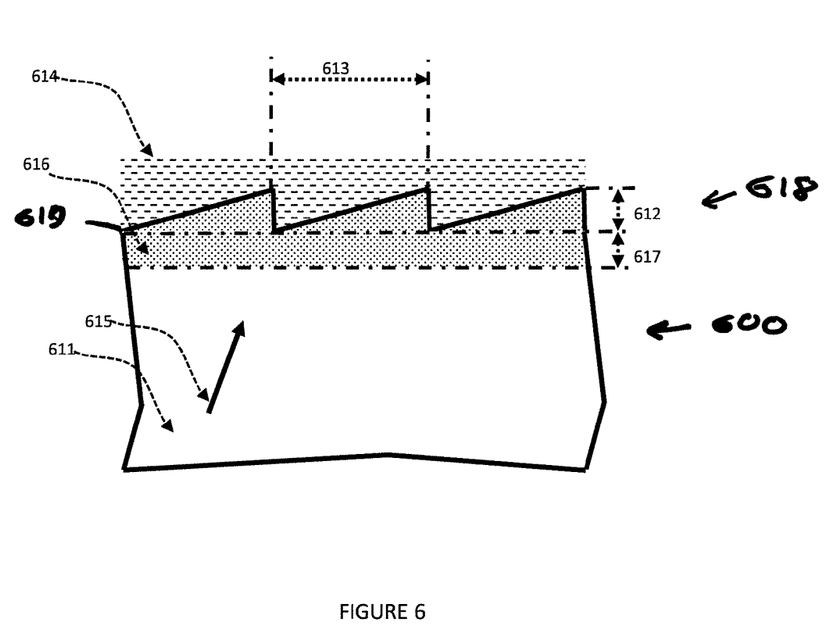
FIG. 6 is a cross-sectional view of an input diffractive optical element for use in an embodiment of the present invention.

FIG. 6 is a cross-sectional view of an optical display device 600 in an embodiment of the present invention. The display device 600 comprises an input diffractive optical element 618 mounted on a substrate 611. The input diffractive optical element 618 comprises a blazed grating 619 having a period 613 of 520 nm and a feature height 612 of 220 nm. The input diffractive optical element 618 also comprises a remnant layer 617, which is formed of the same polymer-based material as the blazed grating 619 and is created at the same time as the blazed grating 619. The remnant layer 617 is positioned adjacent the substrate 611. The depth of the remnant layer 617 is consistent across the blazed grating 619. In this example, the remnant layer depth is 80 nm. An overcoat of silver 614 is applied to the surface of the blazed grating 619. The substrate 611 is typically made of glass and has a refractive index of 1.5. The refractive index of the input diffractive optical element 618, which comprises the blazed grating 619 and the remnant layer 617, is 1.675.

In use, light rays 615 are incident on the substrate 611 from an external light source (not shown) or projector. Light rays 615 are then received at the input diffractive optical element 618 and arrive at the interface between the substrate 611 and the remnant layer 617 where there is a refractive index mismatch. At this point, light is partially reflected by the remnant layer 617 and partially transmitted into the remnant layer 617. The transmitted light is incident on the blazed grating 619 whereupon it is diffracted (with the grating 619 operating in reflection). The depth of the remnant layer 617 is designed such that the diffracted and reflected light paths re-combine and interfere constructively for selected angles of incidence. In other words, the light undergoes thin-film interference. The overcoat of silver 614 advantageously improves diffraction efficiency of the grating 619 to make it suitable for use in the input diffractive optical element 618.

Trace "B" in FIG. 3 shows the diffraction efficiency of the input diffractive optical element 618 for light with a wavelength of 630 nm and an incidence angle in the range ±7°. In comparison to trace "A", trace "B" exhibits a much more even efficiency for angles in the range ±7°. It has been found that this input diffractive optical element 618 can effectively couple light into the substrate 611 for total internal reflection over a field of view of approximately 20°. This is achieved by providing a refractive index mismatch between the input diffractive optical element 618 and the substrate 611 and by providing a remnant layer depth 617 that enables thin-film interference.

Figure 7:
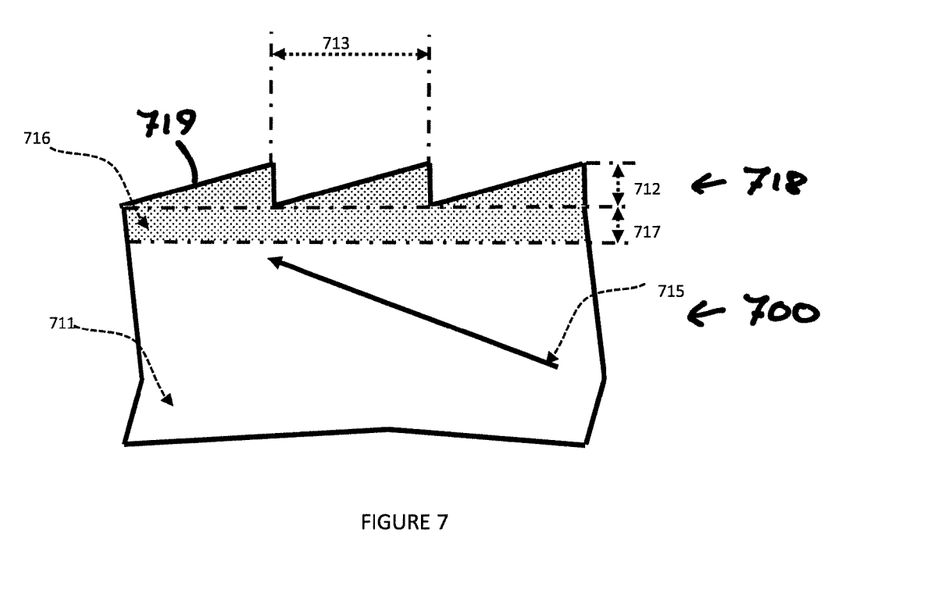
FIG. 7 is a cross-sectional view of an output diffractive optical element for use in an embodiment of the present invention.

FIG. 7 is a cross-sectional view of an optical display device 700 in an embodiment of the present invention. The display device 700 comprises an output diffractive optical element 719 mounted on a substrate 711. The output diffractive optical element 718 comprises a blazed grating 719 having a period 713 of 520 nm and a feature height 712 of 100 nm. The output diffractive optical element 718 also comprises a remnant layer 717, which has the same refractive index as the blazed grating 719 and is created together with the blazed grating 719. The remnant layer 717 is positioned adjacent the substrate 711. The depth of the remnant layer 717 is consistent across the blazed grating 719. In this example, the remnant depth is 30 nm. The grooved surface of the blazed grating 719 is open to air in this embodiment. Trapped light rays 715 are made incident on the output diffractive optical element 718 from the substrate 711. The refractive index of the substrate 711 is 1.5. The refractive index of the output diffractive optical element 718, which comprises the blazed grating 719 and the remnant layer 717, is 1.675.

Trace "D" in FIG. 5 shows the diffraction efficiency of the output diffractive optical element 718 for light with a wavelength of 630 nm and an incidence angle in the range 42° to 70°. It has been found that an improved flatness is achieved for diffraction efficiency over the relevant field of view. This is achieved through the refractive index mismatch of the remnant layer 717 and the substrate 711 and through control of the depth of the remnant layer 717 which can enable constructive thin-film interference for the desired wavelength and field of view.

The output diffractive optical element 719 is designed to operate as a reflective grating. In an alternative arrangement it would be possible to provide constructive thin-film interference with the output diffractive optical element 719 working in transmission.

The optical thickness of the remnant layers 617, 717 is calculated as the absolute thickness of the layer multiplied by its refractive index. The optical thickness of the remnant layers 617, 717 can be calculated to achieve a substantially flat diffraction efficiency response over a range of wavelengths. The optical thickness can be calculated as half the average wavelength for which flat diffraction efficiency is required. Thus, if a flat diffraction efficiency response were required from 530 nm to 630 nm then the optical thickness of the remnant layer can be calculated as 290 nm (which is half of 580 nm—the average of the first and second wavelengths). If the refractive index is 1.675 then this corresponds to an absolute thickness of 173 nm.

The remnant layers 617, 717 are formed of replication polymers, and therefore the optical design may be limited by the availability of different refractive indices. In one embodiment the invention has been demonstrated with remnant layers having a refractive index of 1.70 and a glass substrate 611, 711 having a refractive index of 1.5. In another embodiment the invention has been demonstrated using a refractive index of 1.61 for the substrate 611, 711 and a refractive index of 1.675 for the remnant layers 617, 717.

Figure 8:
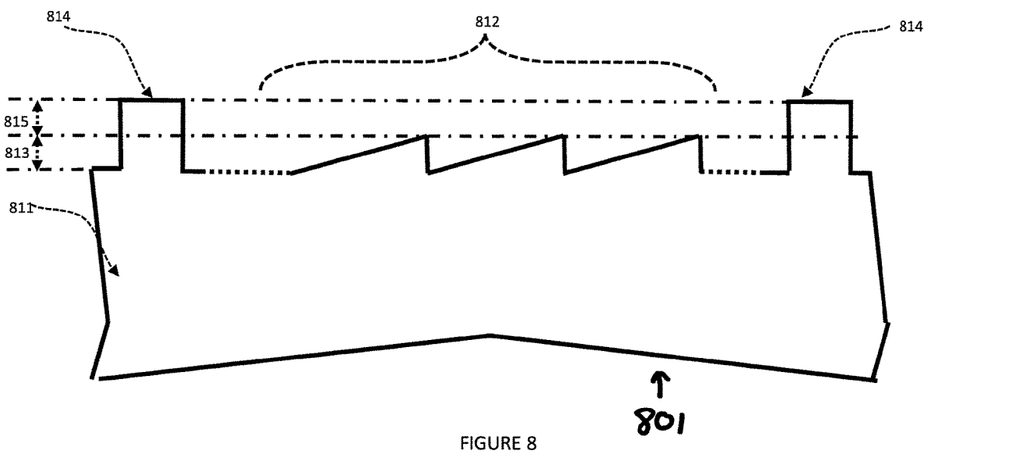
FIG. 8 is a cross-sectional view of a mould for applying to a substrate in a method of manufacture of an optical display device in an embodiment of the present invention.

FIG. 8 shows a cross-sectional view of a mould 801 for use in a method of producing an input or output diffractive optical element in an optical display device. The mould 801 comprises a master substrate 811 and a blazed grating surface 812 formed between a pair of pillars 814. The blazed grating surface 812 has a feature height 813, and a remnant layer depth 815 is defined between the top of the pillars 814 and the top of the blazed grating surface 812.

In a method of producing an optical display device a glass substrate is provided having a refractive index of 1.5. A replication polymer is then provided on top of the glass substrate having a higher refractive index of around 1.675. The depth of replication polymer can be controlled carefully by applying a metered dose of liquid resin by spin coating or ink-jet technology. The mould 801 is applied to the replication polymer on top of the glass substrate and the blazed grating surface 812 can create a complementary grating surface. A remnant layer is created between the pillars 812. The depth of the remnant layer is controlled by the height of the pillars 812 in order to achieve the desired properties of thin-film interference for an input or output diffractive optical element.

The invention claimed is:

1. An optical display device comprising:
a substrate; and
a diffractive optical element comprising a surface relief grating and a remnant layer, wherein the remnant layer is provided between the surface relief grating and the substrate, and the remnant layer has an absolute thickness that is less than 500 nm;
wherein a partially reflective interface is provided between the substrate and the remnant layer, and wherein a thickness of the remnant layer is controlled to enable constructive thin-film interference for light having a predetermined wavelength that is received at the partially reflective interface from the substrate at a predetermined angle of incidence.

2. The optical display device of claim 1 wherein the partially reflective interface is provided between the substrate and the diffractive optical element, and the substrate and the diffractive optical element have respective refractive indices that are mismatched.

3. The optical display device of any of claim 2 wherein the refractive index of the substrate is less than the refractive index of the diffractive optical element.

4. The optical display device of claim 1 wherein the thickness of the remnant layer is controlled to enable thin-film interference for light in a range of wavelengths from a first wavelength to a second wavelength, and wherein an optical thickness of the remnant layer is approximately half of the average of the first and second wavelengths.

5. The optical display device of claim 1 wherein the diffractive optical element is an input diffractive optical element, configured to couple light into the substrate for total internal reflection.

6. The optical display device of claim 5 wherein a reflective coating is provided to the diffractive optical element to improve the efficiency with which light is coupled into the substrate.

7. The optical display device of claim 5 further comprising an output diffractive optical element comprising an output surface relief grating and an output remnant layer, wherein the output remnant layer is provided between the output surface relief grating and the substrate, and wherein an output partially reflective interface is provided between the substrate and the output remnant layer, and wherein a thickness of the output remnant layer is controlled to enable thin-film interference for light having a predetermined wavelength that is received at the output partially reflective interface from the substrate at a predetermined angle of incidence.

8. The optical display device of claim 1 wherein the diffractive optical element is an output diffractive optical element, configured to couple light out of the substrate for viewing by a user.

9. A method of manufacture for an optical display device, the method comprising:
providing a substrate;
providing a diffractive optical element comprising a surface relief grating and a remnant layer, wherein the remnant layer is provided between the surface relief grating and the substrate, and the remnant layer has an absolute thickness that is less than 500 nm;
providing a partially reflective interface between the substrate and the remnant layer; and
controlling a thickness of the remnant layer to enable constructive thin-film interference for light having a predetermined wavelength that is received at the partially reflective interface from the substrate at a predetermined angle of incidence.

10. The method of claim 9 wherein a mould is provided to position the diffractive optical element on the substrate.

11. The method of claim 10 wherein the mould comprises a first portion for creating the surface relief grating and a second portion for creating the remnant layer.

12. The method of claim 10 wherein the mould comprises at least one spacer for positioning the surface relief grating relative to the substrate and for controlling a depth of the remnant layer.

13. The method of claim 9 wherein providing a partially reflective interface comprises providing the substrate and the diffractive optical element with respective refractive indices that are mismatched.

\* \* \* \* \*